(12) United States Patent  
Ji

(10) Patent No.: US 7,570,251 B2
(45) Date of Patent: Aug. 4, 2009

(54) CHARACTER INPUTTING SYSTEM FOR MOBILE TERMINAL AND MOBILE TERMINAL USING THE SAME

(76) Inventor: Hyun Jin Ji, Hyundai Apt. 905-603, 576 Kwangjang-dong, Kwangjin-ku, Seoul (KR)

( * ) Notice: Subject to any disclaimer, the term of this patent is extended or adjusted under 35 U.S.C. 154(b) by 722 days.

(21) Appl. No.: 10/504,871

(22) PCT Filed: Feb. 19, 2003

(86) PCT No.: PCT/KR03/00340

§ 371 (c)(1),
(2), (4) Date: Aug. 17, 2004

(87) PCT Pub. No.: WO03/071698

PCT Pub. Date: Aug. 28, 2003

(65) Prior Publication Data

US 2005/0107111 A1 May 19, 2005

(30) Foreign Application Priority Data

Feb. 19, 2002 (KR) ............... 10-2002-0008839
Apr. 25, 2002 (KR) ............... 10-2002-0022611

(51) Int. Cl.
*G06F 3/02* (2006.01)
*G09G 5/00* (2006.01)
(52) U.S. Cl. .................. 345/169; 345/156; 341/22
(58) Field of Classification Search ......... 345/168–173, 345/156; 715/864, 789; 341/20, 21, 23, 341/26, 28, 156
See application file for complete search history.

(56) References Cited

U.S. PATENT DOCUMENTS

| 4,694,280 | A | * | 9/1987 | Rollhaus et al. ............... 341/26 |
| 5,661,476 | A | * | 8/1997 | Wang et al. .................. 341/22 |
| 5,874,906 | A | * | 2/1999 | Willner et al. ............... 341/22 |
| 5,945,928 | A | * | 8/1999 | Kushler et al. ............... 341/28 |
| 5,982,303 | A | * | 11/1999 | Smith ......................... 341/22 |
| 6,046,732 | A | * | 4/2000 | Nishimoto .................. 345/168 |
| 6,052,070 | A | * | 4/2000 | Kivela et al. ................. 341/22 |
| 6,212,412 | B1 | * | 4/2001 | Rogers et al. ............ 455/575.1 |
| 6,288,709 | B1 | * | 9/2001 | Willner et al. .............. 345/169 |
| 6,753,794 | B1 | * | 6/2004 | Adams ........................ 341/22 |
| 6,756,968 | B2 | * | 6/2004 | McAlindon ................. 345/169 |
| 6,760,013 | B2 | * | 7/2004 | Willner et al. .............. 345/169 |
| 2002/0133503 | A1 | * | 9/2002 | Amar et al. .............. 707/104.1 |
| 2002/0145592 | A1 | * | 10/2002 | Schauer ..................... 345/156 |

* cited by examiner

*Primary Examiner*—Sumati Lefkowitz
*Assistant Examiner*—Robert E Carter, III
(74) *Attorney, Agent, or Firm*—Rosenberg, Klein & Lee

(57) ABSTRACT

A character inputting system for a mobile terminal, and a mobile terminal using the same, is provided, to thereby more efficiently input characters in a mobile terminal in which characters should be input with a small number of keys. The character inputting system includes a key module (10) having five keys, a key signal generator (20) for converting a contact button signal provided from the key module into a key signal and outputting the converted result, and a data generator (30) generating data corresponding to the key signal output from the key signal generator (20).

12 Claims, 4 Drawing Sheets

CHARACTER INPUTTING SYSTEM FOR MOBILE TERMINAL AND MOBILE TERMINAL USING THE SAME

TECHNICAL FIELD

The present invention relates to a character inputting system for a mobile terminal, and a mobile terminal using the same, and more particularly, to a character inputting system for a mobile terminal, and a mobile terminal using the same, for more efficiently inputting characters in a mobile terminal in which characters should be input with a small number of keys.

BACKGROUND ART

In general, in case that the number of keys in a keypad for inputting data is small since a terminal is small-sized like a portable phone, various methods are being used in order to input characters. There is a 'toggle' method as a representative method, in which each numerical key from '0' to '9' is made to correspond to several character keys, so that a desired character is selected and inputted. Also, there is a 'chun-ji-in' (in which 'chun(·)' means the sky, 'ji(ㅡ)' means the earth, and 'in(ㅣ)' means the human in Korean) method for inputting a word by combination of one or more consonants and one or more vowels in which each consonant is assigned to each key and a vowel is produced by combination of 'chun(·)', 'ji(ㅡ)', and 'in(ㅣ)' according to a configurational principle of the vowel. There is also a 'naragul' (which means a mother language in Korean) method for inputting all consonants and vowels by using the minimum number of consonant keys and vowel keys and modifying them.

Since the 'toggle' method requires too many a number of times of manipulation when characters are inputted, to thus consume much time, methods for inputting characters with a smaller number of times of key manipulation have been developed as in the case of the 'chun-ji-in' method or the 'naragul' method. In particular, since the 'chun-ji-in' method or the 'naragul' method needs a relatively small number of times of key manipulation when characters are inputted, it has been employed in a number of terminals.

However, since complicated and burdensome key manipulations are needed in order to input characters by using keypads formed of ten numerical keys from '0' to '9,' characters cannot be speedily inputted.

DISCLOSURE OF THE INVENTION

To solve the above problems, it is an object of the present invention to provide a character inputting system for a mobile terminal, and a mobile terminal using the same, in which a minimum number of keys are disposed in a terminal restricted by space where a number of keys cannot be arranged in order to input characters as in mobile phones, personal digital assistants (PDAs), portable computers, or TV remote controllers, and thus desired characters can be smoothly input by using the minimum number of keys.

To accomplish the above object of the present invention, there is provided a system for inputting character data in a mobile terminal, the character inputting system comprising: a key module having a center key disposed in the center, and an upper key, a lower key, a left key and a right key which are disposed in the top, bottom, left and right sides of the center key, respectively; a signal generator for generating at least one kind of signals, among five normal-key signals which are generated by clicking each key in the key module, five long-key signals which are generated by clicking each key for a predetermined time or longer, five double-key signals which are generated by clicking each key twice within a predetermined time, four dual-key signals which are generated by clicking two adjacent keys simultaneously among the four keys except for the center key, first combination key signals formed of a combination of consecutive two normal-key signals among the normal-key signals, and second combination key signals formed of either one of a combination of a normal-key signal and a long-key signal, or a combination of a normal-key signal and a double-key signal; and a data generator for generating a character corresponding to a combination of the signals output from the signal generator, or control data for inputting the character.

The data generator further comprises a memory storing Korean vowels and consonants, English alphabet, Chinese Pinyin characters, arabic numbers, symbolic characters, and control data having functions of space/character deletion/cursor movement/selection, which are classified into a language mode such as a Korean mode, an English mode, and a Chinese Pinyin mode, a figure mode, a symbol mode, and a control mode.

The key module further comprises a mode key generating a key signal which enables a user to select one mode to be input among the respective modes, and a seventh key generating a separate key signal.

The data generator generates 'ㅗ', 'ㅏ', 'ㅜ', and 'ㅓ' among the Korean vowels if a signal generated by clicking each key combination of the center key-upper key, the center key-right key, the center key-lower key, and the center key-left key, is input as the first combination key signal from the signal generator, in the case that a mode set by the mode key is the Korean mode.

The data generator generates 'ㅛ', 'ㅑ', 'ㅠ' and 'ㅕ' among the Korean vowels if a signal generated by clicking each key combination of the upper key-upper key, the right key-right key, the lower key-lower key, and the left key-left key, is input as the first combination key signal from the signal generator, in the case that a mode set by the mode key is the Korean mode.

The data generator generates 'ㅡ', 'ㅣ' and among the Korean vowels if a signal generated by clicking each key combination of the lower key-center key, and the right key-center key, is input as the first combination key signal from the signal generator, in the case that a mode set by the mode key is the Korean mode.

The data generator generates 'ㄱ', 'ㄴ', 'ㄷ', 'ㄹ', 'ㅁ', 'ㅂ', 'ㅅ', 'ㅇ', 'ㅈ', 'ㅊ', 'ㅋ', 'ㅌ', 'ㅍ', and 'ㅎ' among the Korean consonants by each combination signal, if a signal generated by clicking each key combination of the upper key-right key, the left key-lower key, the left key-center key, the lower key-upper key, the right key-left key, the lower key-right key, the upper key-center key, the left key-right key, the upper key-lower key, the right key-lower key, the upper key-left key, the left key-upper key, the lower key-left key, and the right key-upper key, is input as the first combination key signal from the signal generator, in the case that a mode set by the mode key is the Korean mode.

The data generator generates 'ㄲ', 'ㄸ', 'ㅃ', 'ㅆ', and 'ㅉ' among the Korean consonants if a signal generated by clicking each key combination of the upper key-right key, the left key-center key, the lower key-right key, and the upper key-lower key, is input as the second combination key signal from the signal generator, in the case that a mode set by the mode key is the Korean mode.

The data generator generates 'n', 'D', 'U', and 'C' among the English alphabetical characters or the Chinese Pinyin characters if a signal generated by clicking each key combination of the upper key-center key, the right key-center key, the lower key-center key, and the left key-center key, is input as the first combination key signal from the signal generator, in the case that a mode set by the mode key is the English mode or the Chinese Pinyin mode.

The data generator generates 'm', 'B', 'W', and 'E' among the English alphabetical characters or the Chinese Pinyin characters if a signal generated by clicking each key combination of the upper key-upper key, the right key-right key, the lower key-lower key, and the left key-left key, is input as the first combination key signal from the signal generator, in the case that a mode set by the mode key is the English mode or the Chinese Pinyin mode.

The data generator generates 'A', 'F', 'G', 'H', 'I', 'J', 'K', 'L', 'O', 'P', 'Q', 'R', 'S', 'T', 'X' and 'Z' among the English alphabetical characters or the Chinese Pinyin characters, if a signal generated by clicking each key combination of the upper key-right key, the left key-lower key, the left key-center key, the lower key-upper key, the right key-left key, the lower key-right key, the upper key-center key, the left key-right key, the upper key-lower key, the right key-lower key, the upper key-left key, the left key-upper key, the lower key-left key, and the right key-upper key, is input as the first combination key signal from the signal generator, in the case that a mode set by the mode key is the English mode or the Chinese Pinyin mode.

The data generator generates 'V' and 'Y' among the English alphabetical characters or the Chinese Pinyin characters, if a signal generated by clicking each key combination of the lower key-center key, and the center key-upper key, is input as the second combination key signal from the signal generator, in the case that a mode set by the mode key is the English mode or the Chinese Pinyin mode. Here, in the case that the mode is the Chinese Pinyin mode, 'ü' is generated instead of 'V'.

The data generator generates a figure corresponding to each key signal, if the each key signal is input at a state where the five normal-key signals, the four dual-key signals and the seventh key signal of the seventh key in the key module, are set the arabic numbers of '0' to '9' respectively, in the case that a mode set by the mode key is the figure mode.

The data generator generates a symbolic character corresponding to each phoneme, if at least one phoneme included in each symbol name is established in advance so as to identify each symbol, and at least one phoneme established by each symbol is input, in the case that a mode set by the mode key is the symbolic mode.

The data generator generates '.' for 'ㅁ' and 'ㅊ', ',' for 'ㅅ' and 'ㅁ', '!' for 'ㄴ' and 'ㄱ', '?' for 'ㅁ' and 'ㅇ', '#' for 'ㅅ' and 'ㅍ' (or 'ㅇ' and 'ㅁ'), '%' for 'ㅍ' and 'ㅅ', '^' for 'ㅎ' and 'ㅌ' (or 'ㅅ' and 'ㄱ'), '&' for 'ㅇ' and 'ㄷ', '*' for 'ㅂ' and 'ㄹ' (or 'ㅅ' and 'ㅌ'), '@' for 'ㅇ' and 'ㅌ' (or 'ㄱ' and 'ㅂ'), '|' for 'ㅇ' and 'ㅇ' (or 'ㅁ' and 'ㄷ'), '~' for 'ㅌ' and 'ㄷ' (or 'ㅁ' and 'ㄱ'), ';' for 'ㅅ' and 'ㅋ', ':' for 'ㅋ' and 'ㄹ', '-' for 'ㅎ' and 'ㅍ', '/' for 'ㅅ' and 'ㅅ' (or 'ㅅ' and 'ㅋ'), and '"' for 'ㅌ' and 'ㄷ' (or 'ㅇ' and 'ㅇ'), if the selected two phonemes are input among the Korean names of the respective symbols, in the case that a mode set by the mode key is the symbolic mode.

The key module further comprises four keys, instead of using the dual key signals, in which one is arranged between the upper key and the right key, another between the right key and the lower key, another between the lower key and the left key, and the other between the left key and the upper key.

The data generator generates a figure corresponding to each key signal, if the each key signal is input from the signal generator at a state where the five normal-key signals, the four key signals of four keys arranged respectively between the upper key and the right key, between the right key and the lower key, between the lower key and the left key, and between the left key and the upper key, and the seventh key signal of the seventh key in the key module, are set the ten arabic numbers of '0' to '9' respectively, in the case that a mode set by the mode key is the figure mode.

According to another aspect of the present invention, there is also provided a mobile terminal having a system for inputting character data, the mobile terminal comprising: a character inputting system including: a key module having a center key disposed in the center, and an upper key, a lower key, a left key and a right key which are disposed in the top, bottom, left and right sides of the center key, respectively; a signal generator for generating at least one kind of signals, among five normal-key signals which are generated by clicking each key in the key module, five long-key signals which are generated by clicking each key for a predetermined time or longer, five double-key signals which are generated by clicking each key twice within a predetermined time, four dual-key signals which are generated by clicking two adjacent keys simultaneously among the four keys except for the center key, first combination key signals formed of a combination of consecutive two normal-key signals among the normal-key signals, and second combination key signals formed of either one of a combination of a normal-key signal and a long-key signal, or a combination of a normal-key signal and a double-key signal; and a data generator for generating a character corresponding to a combination of the signals output from the signal generator, or control data for inputting the character; and a display displaying characters input by the character inputting system.

The data generator further comprises a memory storing Korean vowels and consonants, English alphabet, Chinese Pinyin characters, arabic numbers, symbolic characters, and control data having functions of space/character deletion/cursor movement/selection, which are classified into a language mode such as a Korean mode, an English mode, and a Chinese Pinyin mode, a figure mode, a symbol mode, and a control mode.

The key module further comprises a mode key generating a key signal which enables a user to select one mode to be input among the respective modes, and a seventh key generating a separate key signal.

The data generator generates 'n', 'D', 'U', and 'C' among the English alphabetical characters or the Chinese Pinyin characters if a signal generated by clicking each key combination of the upper key-center key, the right key-center key, the lower key-center key, and the left key-center key, is input as the first combination key signal from the signal generator, in the case that a mode set by the mode key is the English mode or the Chinese Pinyin mode.

The data generator generates 'm', 'B', 'W', and 'E' among the English alphabetical characters or the Chinese Pinyin characters if a signal generated by clicking each key combination of the upper key-upper key, the right key-right key, the lower key-lower key, and the left key-left key, is input as the first combination key signal from the signal generator, in the case that a mode set by the mode key is the English mode or the Chinese Pinyin mode.

The data generator generates 'A', 'F', 'G', 'H', 'I', 'J', 'K', 'L', 'O', 'P', 'Q', 'R', 'S', 'T', 'X' and 'Z' among the English alphabetical characters or the Chinese Pinyin characters, if a signal generated by clicking each key combination of the upper key-right key, the left key-lower key, the left key-center key, the lower key-upper key, the right key-left key, the lower key-right key, the upper key-center key, the left key-right key, the upper key-lower key, the right key-lower key, the upper key-left key, the left key-upper key, the lower key-left key, and the right key-upper key, is input as the first combination key signal from the signal generator, in the case that a mode set by the mode key is the English mode or the Chinese Pinyin mode.

The data generator generates 'V' or 'Ü', and 'Y' among the English alphabetical characters or the Chinese Pinyin characters, if a signal generated by clicking each key combination of the lower key-center key, and the center key-upper key, is input as the second combination key signal from the signal generator, in the case that a mode set by the mode key is the English mode or the Chinese Pinyin mode.

The data generator displays at least one Chinese character among the Chinese characters corresponding to pronunciation of the input Chinese Pinyin characters, on the display to then be selected to generate the selected Chinese character, if the Chinese Pinyin characters by 'A', 'B', 'C', 'D', 'E', 'F', 'G', 'H', 'I', 'J', 'K', 'L', 'M', 'N', 'O', 'P', 'Q', 'R', 'S', 'T', 'U', 'X', 'Y', 'Z', and 'Ü' among the English alphabetical characters, is input from the key module and the key signal generator, in the case that a mode set by the mode key is the Chinese Pinyin mode.

The data generator further comprises a typographical error warning unit for generating vibration or warning sounds, in the case that the key signal input from the key module and the key signal generator cannot produce a character correctly, or data corresponding to the input key signal does not exist.

The data generator further comprises a text-to-speech (TTS) module in which a character corresponding to data input from the key module and the key signal generator is converted into a sound signal to then be output.

The key module further comprises four keys, instead of using the dual key signals, in which one is arranged between the upper key and the right key, another between the right key and the lower key, another between the lower key and the left key, and the other between the left key and the upper key.

The data generator generates a figure corresponding to each key signal, if the each key signal is input from the signal generator at a state where the five normal-key signals, the four key signals of four keys arranged respectively between the upper key and the right key, between the right key and the lower key, between the lower key and the left key, and between the left key and the upper key, and the seventh key signal of the seventh key in the key module, are set the ten arabic numbers of '0' to '9' respectively, in the case that a mode set by the mode key is the figure mode.

BRIEF DESCRIPTION OF THE DRAWINGS

The above and other objects and advantages of the present invention will become more apparent by describing the preferred embodiments thereof in more detail with reference to the accompanying drawings in which.

BEST MODE FOR CARRYING OUT THE INVENTION

A preferred embodiment of the present invention will be described with reference to the accompanying drawings.

Figure 1:
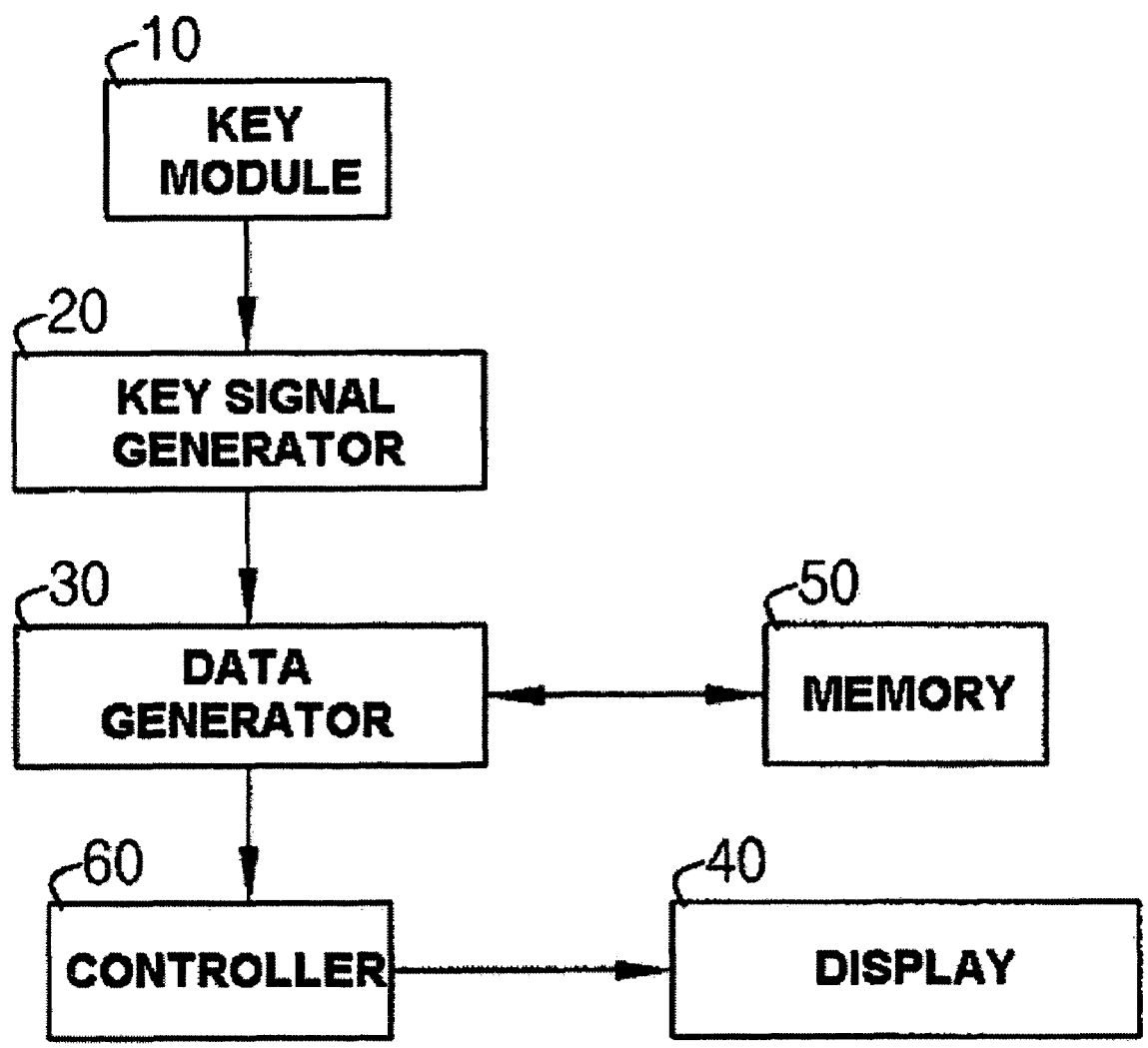
FIG. 1 is a block diagram for explaining a character inputting system in a mobile terminal according to the present invention.

As shown in FIG. 1, a system for inputting character data in a mobile terminal according to the present invention, includes a key module 10 having five contact buttons, a signal generator 20 connected to the key module 10, for generating key signals, and a data generator 30 reading out the key signal input from the key signal generator 20, and generating data such as a character, figure, symbol, and control data in correspondence to the read-out result, a memory 50 connected to the data generator 30, storing data corresponding to a plurality of key signals output from the key signal generator 20, a display 40 displaying data thereon, and a controller 60 controlling data input from the data generator 30 to be displayed on the display 40 and controlling operations of the terminal.

Figure 2:
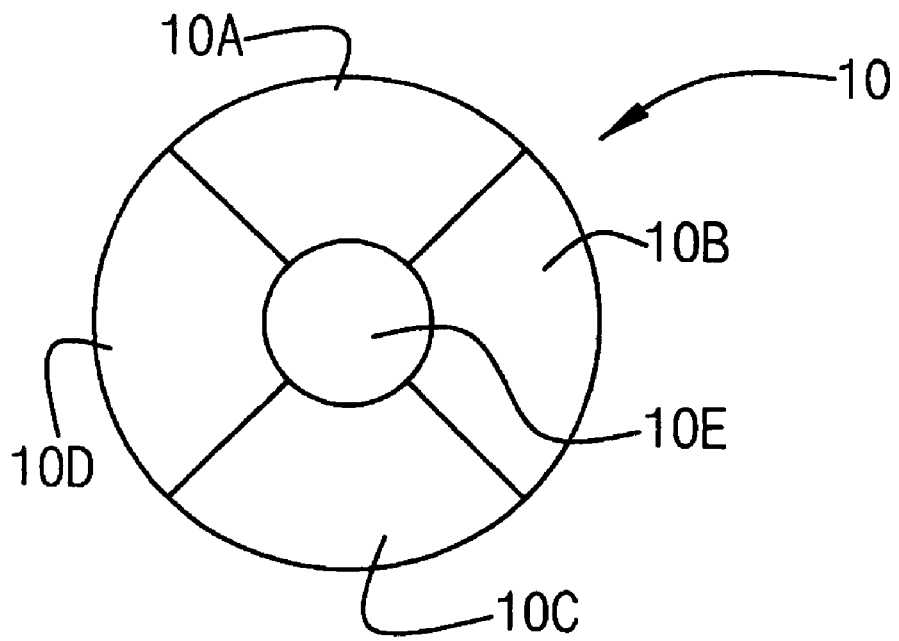
FIGS. 2 through 5 are exemplary views for explaining various embodiments of a key module according to the present invention.

As shown in FIG. 2, the key module 10 includes a center key 10E disposed in the center, and an upper key 10A, a right key 10B, a lower key 1C, and a left key 10D which are disposed in the top, right, bottom, and left sides around the center key 10E, respectively.

Figure 3:
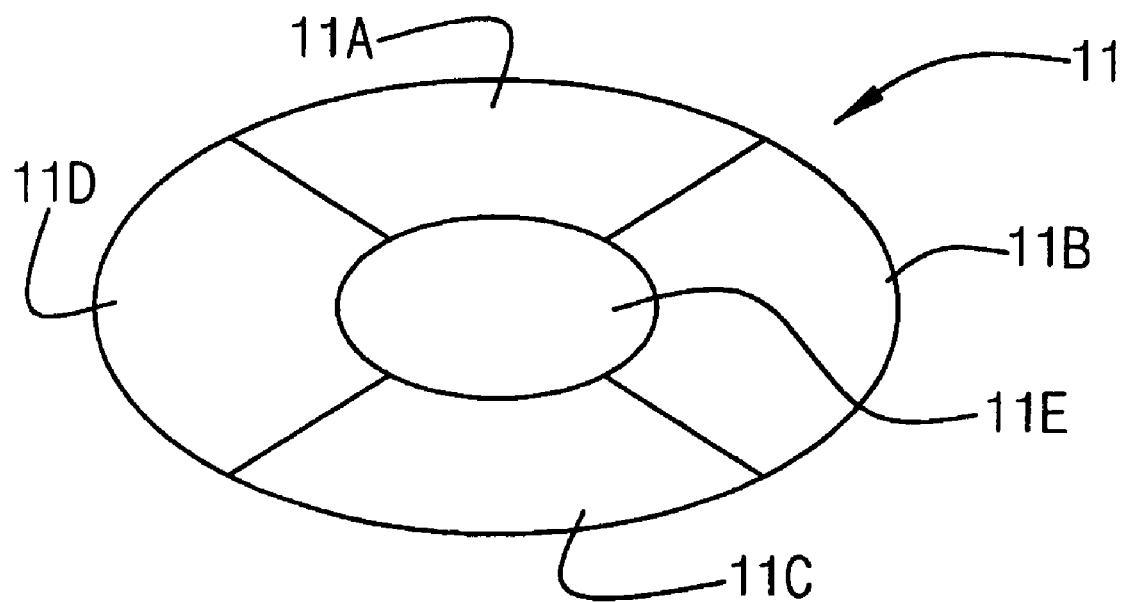

The key module 10 can be formed in a circular shape, as shown in FIG. 2, and the key module 11 can be formed in an oval shape as shown in FIG. 3. In FIG. 3, keys are arranged to have a center key 11E at the center, and an upper key 11A, a right key 11B, a lower key 11C and a left key 11D in a clockwise direction from the top of the center key 11E.

Figure 4:
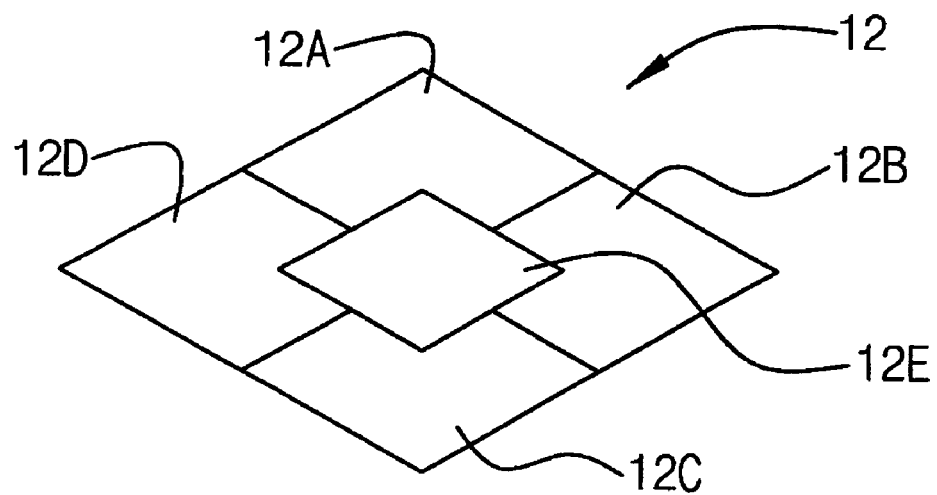

Also, the key module 12 can be formed in a diamond shape as shown in FIG. 4, in which case an upper key 12A, a right key 12B, a lower key 12C and a left key 12D in a clockwise direction from the top of the center key 12E disposed at the center, are arranged.

Figure 5:
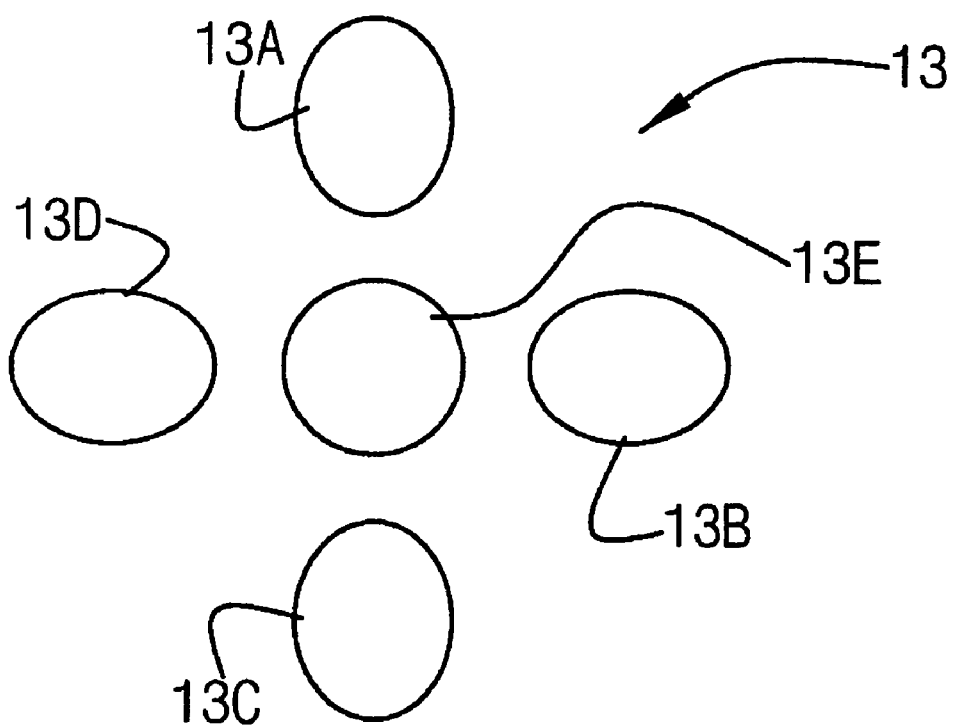

Although boundaries of the respective keys are partitioned in a slant direction and adjacent to each other, in the key modules according to the embodiments of shown in FIGS. 2 through 4, each key in the key module 13 can be formed in a completely separated structure distant by a predetermined distance as shown in FIG. 5, in which case an upper key 13A, a right key 13B, a lower key 13C and a left key 13D in a clockwise direction from the top of the center key 13E disposed at the center, are arranged.

The Korean vowels and consonants, English alphabetical characters, and Chinese Pinyin characters, can be input by using the above-described invention.

The key signals which can be generated by using the key module 10 and the key signal generator 20 are as follows.

1. Normal-Key Signals

Five key signals which are generated from the key signal generator 20, when clicking each key of an, upper key 10A, a right key 10B, a lower key 10C, a left key 10D, and a center key 10E in the key module.

2. Long-Key Signals

Five key signals which are generated from the key signal generator 20, when clicking each normal-key once for a predetermined time or longer.

3. Double-Key Signals

Five double-key signals which are generated from the key signal generator 20, when clicking each normal-key twice within a predetermined time.

4. Dual-Key Signals

Four dual-key signals which are generated by clicking two adjacent keys simultaneously among the four keys such as an upper key 10A, a right key 10B, a lower key 10C, and a left key 10D except for the center key 10E, among the five normal-keys.

5. First Combination Key Signals

Key signals formed of a combination of two normal-key signals among the normal-key signals 6. Second Combination Key Signals Key signals formed of either one of a combination of a normal-key signal and a long-key signal, or a combination of a normal-key signal and a double-key signal.

As described above, when characters including symbols, or space data are inputted by using six kinds of key signals, the first combination key signal or the second combination key signal is used. Also, when a figure is inputted, each normal-key signal such as an upper key 10A, a right key 10B, a lower key 10C, a left key 10D, and a center key 10E, a dual-key signal using a combination of an upper key 10A and a right key 10B, a combination of a right key 10B and a lower key 10C, a combination of a lower key 10C and a left key. 10D, and a combination of a left key 10D and an upper key 10A, and a seventh key. Also, when control data, that is, control data such as character deletion/cursor movement/selection for inputting characters is inputted, normal key signals, long-key signals, and dual-key signals, using each normal-key, are used.

When a key signal is input from the key module 10 and the key signal generator 20, the data generator 30 finds out data corresponding to the input key signal from the memory 50, to be displayed on the display 40, or inputted to the controller 60 so as to be processed by a predetermined program in a terminal.

An inputting process of character data in the present invention will be described.

Since character data differs by each language, a character mode is processed separately in each language.

For example, the character mode can be divided into the Korean mode for inputting Korean vowels and consonants, the English mode for inputting English alphabets, the other language mode for inputting the other alphabets, the Chinese Pinyin mode for inputting the Chinese characters by using Pinyin of the Chinese language, etc. Here, a language mode provided for a terminal is set according to the features of a country where the terminal is used. Also, irrespective of the number and kinds of the applied language modes, the present invention includes a figure mode for inputting arabic numbers, a symbolic mode for inputting symbolic characters, and control mode for inputting control data having control functions such as space addition, character deletion, cursor movement, selection, etc.

Thus, the key module 10 further includes at least two keys in addition to the five keys.

As one key, the key module 10 is another key signal added to the nine key signals of the five key signal using the normal-key signal, and the four key signals using the dual-key signal. As a result, the total ten key signals enable ten arabic numbers of '0' through '9' to be inputted.

As the other key, the key module 10 includes a mode key for selecting a mode. The mode key is set a functional mode which is used in a terminal at an initial set. If the mode key is clicked at this state, the mode is toggled into a figure mode for inputting telephone numbers, a language mode assigned to a corresponding terminal (presented in sequence of use frequency if the several language modes are applied therein), a control mode, and a symbolic mode, in sequence.

As described above, in the case that an input mode is set the Korean mode by using the mode key, the Korean vowels and consonants are inputted as follows.

According to the 'chun-ji-in' principle constructing the Korean vowels, 'ㅗ', 'ㅏ', 'ㅜ', and 'ㅓ' among the Korean vowels are inputted by assigning 'ji' corresponding to 'ㅡ', or 'in' corresponding to 'ㅣ' to the center key, and then additionally clicking a key put in the direction of 'chun' corresponding to '·'. That is, the Korean vowels 'ㅗ', 'ㅏ', 'ㅜ', and 'ㅓ' are generated from the data generator 30 to the controller 60, if a signal generated by clicking each key combination of the center key-upper key, the center key-right key, the center key-lower key, and the center key-left key, is input as the first combination key signal from the signal generator 20.

Among the Korean vowels, 'ㅛ', 'ㅑ', 'ㅠ' and 'ㅕ' are processed by clicking the second key signal twice among the key combination signals of 'ㅗ', 'ㅏ', 'ㅜ', and 'ㅓ', in order to make an application of the key combination of inputting the 'ㅗ', 'ㅏ', 'ㅜ', and 'ㅓ'.

Thus, the Korean vowels 'ㅛ', 'ㅑ', 'ㅠ', and 'ㅕ' are processed by clicking an upper key 10A, a right key 10B, a lower key 10C, and a left key 10D twice, respectively. As a result, each key combination of the upper key-upper key, the right key-right key, the lower key-lower key, and the left key-left key, is input as the first combination key signal from the signal generator 20 to the data generator 30, and each character is input to the controller 60.

The Korean vowels 'ㅡ', and 'ㅣ' is processed by a combination of the lower key-center key, and the right key-center key, respectively, as the first combination key signals.

The Korean consonants 'ㄱ', 'ㄴ', 'ㄷ', 'ㄹ', 'ㅁ', 'ㅂ', 'ㅅ', 'ㅇ', 'ㅈ', 'ㅊ', 'ㅋ', 'ㅌ', 'ㅍ', and 'ㅎ' are processed as the first combination key signal, by using a signal generated by each key combination of the upper key-right key, the left key-lower key, the left key-center key, the lower key-upper key, the right key-left key, the lower key-right key, the upper key-center key, the left key-right key, the upper key-lower key, the right key-lower key, the upper key-left key, the left key-upper key, the lower key-left key, and the right key-upper key.

Among the Korean consonants, 'ㄲ', 'ㄸ', 'ㅃ', 'ㅆ', and 'ㅉ' which are strong sounds of 'ㄱ', 'ㄷ', 'ㅂ', 'ㅅ', and 'ㅈ', respectively, are processed by using a signal generated by each key combination of the upper key-right key, the left key-center key, the lower key-right key, and the upper key-lower key, as the second combination key signal.

For an English mode, a current mode is converted into the English mode by using the mode key, and the English alphabetical characters are processed as follows.

Since the shapes of 'n', 'D', 'U', and 'C' among the English alphabetical characters are crooked once in any one direction, key combination is accomplished in association with the one-time crooked shape.

Thus, the 'n', 'D', 'U', and 'C' are processed by each key combination of the upper key-center key, the right key-center key, the lower key-center key, and the left key-center key, as the first combination key signal.

Since the shapes of 'm', 'B', 'W', and 'E' among the English alphabetical characters are crooked twice, key combination is accomplished in association with the two-time crooked shape. Here, 'E' is processed in association of 'ϵ'.

Thus, the 'm', 'B', 'W', and 'E' are processed by each key combination of the upper key-upper key, the right key-right key, the lower key-lower key, and the left key-left key, as the first combination key signal.

Among the English alphabetical characters 'A', 'F', 'G', 'H', 'I', 'J', 'K', 'L', 'O', 'P', 'Q', 'R', 'S', 'T', 'X' and 'Z' are processed by each key combination of the upper key-right key, the left key-lower key, the left key-center key, the lower key-upper key, the right key-left key, the lower key-right key, the upper key-center key, the left key-right key, the upper key-lower key, the right key-lower key, the upper key-left key, the left key-upper key, the lower key-left key, and the right key-upper key, as the first combination key signal from the signal generator.

Among the English alphabetical characters, 'V', and 'Y' are processed by depressing a key secondly inputted at a process of inputting 'U' and 'T' for a predetermined time or longer, or by using a key signal generated by clicking the keys consecutively twice within a predetermined time. Thus, the 'V' and 'Y' are processed by each key combination as the second combination key signal.

Meanwhile, the Chinese characters are input as the Chinese Pinyin characters by using the English alphabetical characters excluding 'V', and a character 'Ü', and then selecting a desired Chinese character among the Chinese characters corresponding to the input Chinese Pinyin characters. The Chinese Pinyin characters are processed in the same manner as the key combination of the English characters, except for the character 'Ü'. The character 'Ü' is input in the same manner as that of the English alphabet 'V'. Thus, the Chinese Pinyin characters used in the Chinese Pinyin mode, are 'A', 'B', 'C', 'D', 'E', 'F', 'G', 'H', 'I', 'J', 'K', 'L', 'M', 'N', 'O', 'P', 'Q', 'R', 'S', 'T', 'U', 'X', 'Y', 'Z', and 'Ü', excluding the English alphabet 'V'.

Figure 6:
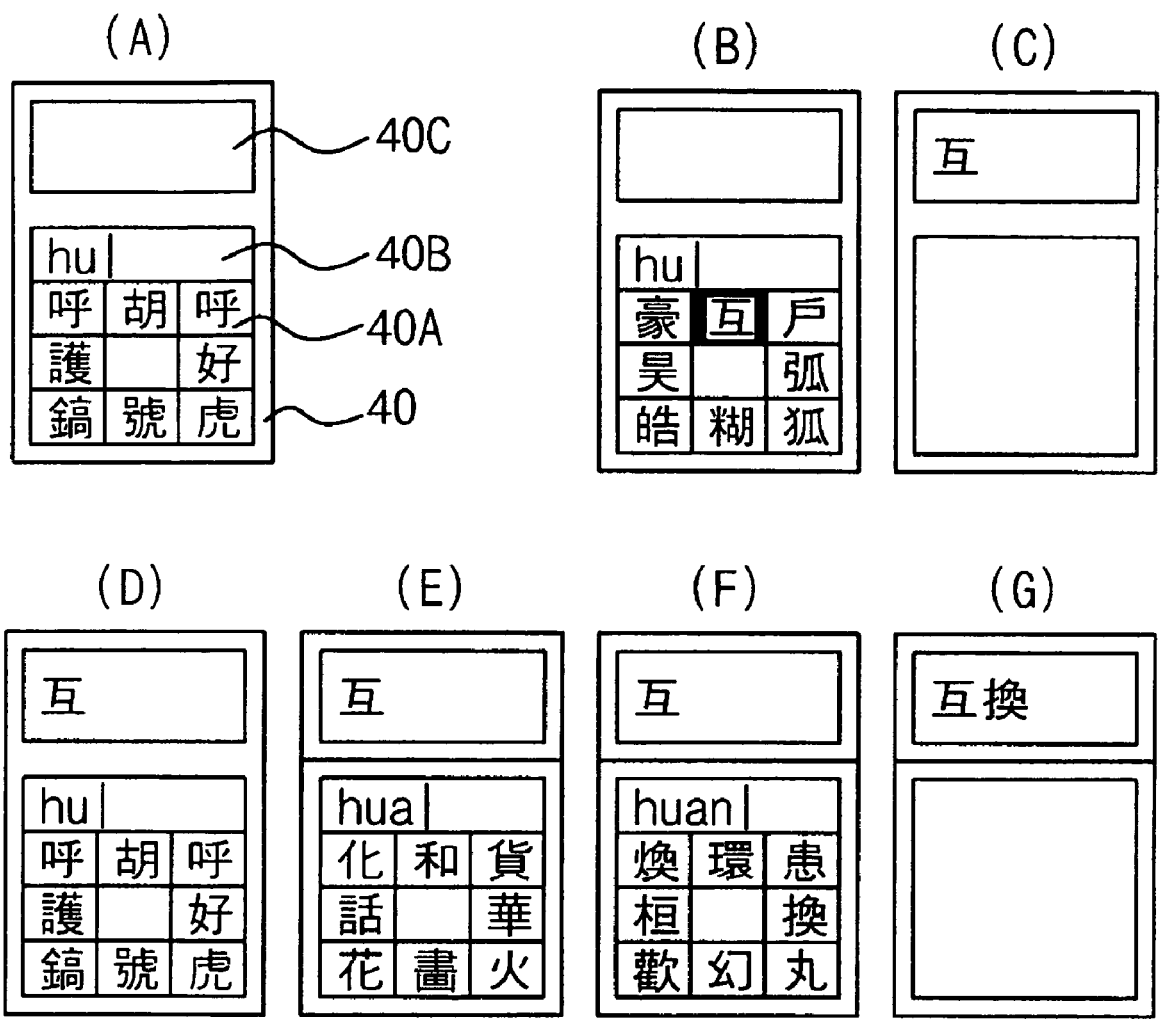
FIG. 6 is exemplary views for explaining a method for inputting a Chinese character according to the present invention.

As described above, the Chinese Pinyin mode is processed in a process shown in FIG. 6. If a current mode is converted into the Chinese Pinyin mode, the display 60 is divided into a Pinyin input window 40B, a character display window 40C, and a selection display window 40A, as shown in FIG. 6.

A process in the Chinese Pinyin mode, will be described by example of 'huan' ('互換') which means an 'exchange' in English.

1. Using the key module 10 and the key signal generator 20, 'h' and 'u' which are the Chinese Pinyin of the Chinese character '互' are sequentially input on the Pinyin input window 40B. Thus, the 'hu' is input on the data generator 30 as a key signal made of a combination of the right key-left key and a combination of the lower key-center key. If the key signals are input as described above, eight characters whose use frequency is the most frequent among the Chinese characters corresponding to 'hu' are displayed on the selection window 40A as a first set (refer to (A) of FIG. 6).

2. If a desired Chinese character is displayed on the selection window 40A, a user selects his or her desired character, by using total eight keys as direction keys, including the four normal key excluding the center key 10E and the four dual keys (refer to (B) of FIG. 6).

3. The selected character is displayed on the character display window 40C (refer to (C) of FIG. 6).

4. Then, if 'h', 'u', 'a' and 'n' are sequentially input by using the key module 10 and the key signal generator 20, in order to input the Chinese character '換', a Chinese character is displayed in the case that the Chinese character corresponding to the Pinyin characters exists. That is, since the Pinyin of '換' is 'huan', and Chinese characters corresponding to 'hu' and 'hua' exist at the process of inputting 'huan', the Chinese characters corresponding to 'hu' (refer to (D) of FIG. 6) and 'hua' (refer to (E) of FIG. 6) are displayed and finally the Chinese character corresponding to 'huan' is displayed (refer to (F) of FIG. 6).

5. Likewise, if a desired character is selected, the selected character is displayed on the character display window 40C (refer to (G) of FIG. 6).

Meanwhile, arabic numbers using a figure mode are input as follows. The arabic numbers are ten numbers made of '0' through '9'. Thus, total ten key signals including five key signals formed of the normal key signals produced by the upper key 10A, the right key 10B, the lower key 10C, the left key 10D, and the center key 10E, which are basic keys forming the key module 10, four key signals of the dual-key signals and a key signal of the seventh key signal produced by an additional key which is called a seventh key, are used to perform the figure mode.

For example, '1' is processed by clicking the upper key 10A, '2' is processed by clicking the upper key 10A and the right key 10B simultaneously, '3' is processed by clicking the right key 10B, '4' is processed by clicking the upper key 10A and the lower key 10C, simultaneously, '5' is processed by clicking the lower key 10C, '6' is processed by clicking the lower key 10C and the left key 10D, simultaneously, '7' is processed by clicking the left key 10D, '8' is processed by clicking the left key 10D and the upper key 10A, simultaneously, '9' is processed by clicking the center key 10E, and '0' is processed by clicking the additional key, that is, the seventh key.

Also, in addition to the above-described Korean, English and Chinese, there are symbolic characters such as a periodic symbol and a comma.

In order to input the symbolic characters, the present invention extracts at least two representative phonemes which can represent each symbol among the name of each symbol, and inputs the phoneme corresponding to each symbol.

In case of the Korean language, the Korean name of each symbol and the extracted two phonemes are illustrated in Table 1.

TABLE 1

| Symbol | Pronunciation | 1st input character | 2nd input character |
| --- | --- | --- | --- |
| . | Period | ㅁ | ㅊ |
| , | Comma | ㅅ | ㅁ |
| ! | Exclaim | ㄴ | ㄱ |
| ? | Question | ㅁ | ㅇ |
| # | Sharp | ㅅ(ㅇ) | ㅍ(ㅁ) |
| % | Percent | ㅍ | ㅅ |
| ^ | Hat | ㅎ(ㅅ) | ㅌ(ㄱ) |
| & | And | ㅇ | ㄷ |
| * | Star | ㅂ(ㅅ) | ㄹ(ㅌ) |
| @ | At | ㅇ(ㄱ) | ㄹ(ㅂ) |
| \| | Bar | ㅇ(ㅁ) | ㅇ(ㄱ) |
| ~ | Wave | ㅌ(ㅁ) | ㄷ(ㄱ) |
| ; | Semicolon | ㅅ | ㅋ |
| : | Colon | ㅋ | ㄹ |
| - | Hyphen | ㅎ | ㅍ |

TABLE 1-continued

| Symbol | Pronunciation | 1st input character | 2nd input character |
|---|---|---|---|
| / | Slash | ㅅ(ㅅ) | ㄹ(ㅅ) |
| , | Quote | ㅋ(ㄷ) | ㅌ(ㅇ) |

In the above Table 1, for example, the meanings of the firstly input character and the secondly input character are to extract 'ㅁ' and 'ㅊ' as the representative characters and input the 'ㅁ' 'ㅊ' and in the same manner as in the Korean mode, since a symbol '.' is pronounced as 'period'.

A mobile terminal which can use the mobile terminal character inputting system as an input unit according to the present invention is a mobile phone, a personal digital assistant (PDA), a portable computer, a TV remote controller set, etc.

Thus, the mobile terminal adopts the above-described mobile terminal character inputting system therein together with the other elements.

In the case of a mobile phone terminal, the mobile terminal character inputting system is used as an input system other than the mobile phone terminal elements for embodying a mobile phone function. In the case of a PDA or a portable computer, the mobile terminal character inputting system is used in a system for processing data of the PDA or portable computer, as an input system. In the case of a TV remote controller set, the mobile terminal character inputting system is used as an input unit of character data, when an input of characters is needed for the purpose of a search of programs, an input of identification and password, an order of products, etc.

Although the character inputting system is applied to a variety of mobile terminals, a method of inputting data such as characters is applied identically.

Also, when characters are input in the mobile terminal using the character inputting system, the input key signals may not create a normal character, or a character corresponding to the input key does not exist in the memory 50, that is, a typographical error may occur. In order to prevent the above-described situations, the data generator 30 can notify a user of the situations through a typographical error warning unit (not shown) such as vibrations or warning sounds, if an input key signal is abnormal, or the character corresponding to the input key signal does not exist in the memory 50.

Also, when characters are input to make up a sentence, an input sentence may be transferred without checking whether or not the input sentence is correctly made up on the display 40. For this case, the data generator 30 increases convenience in use, through a text to speech (TTS) module (not shown) which converts texts into sounds and outputs the converted result. The function of the TTS module can be used as a declaration of intention unit for a disabled person who cannot speak verbally.

The character inputting method according to the present invention is compared with the existing methods, that is, the 'chun-ji-in' Korean character inputting method which is used in mobile phone terminals produced in Samsung Electronics Co., Ltd., the 'naragul' Korean character inputting method which is used in mobile phone terminals produced in LG Electronics Co., Ltd., and the Korean character inputting method which is used in mobile phone terminals produced in SK Telecom Co., Ltd., and illustrated in Table 2.

TABLE 2

| Sentence to be input | Samsung | LG | SK | Present invention |
|---|---|---|---|---|
| 사랑해 | 8975 (13) | 6740 (9) | 6805 (10) | 6480 (16) |
| 지금 전화해줘 | 19800 (28) | 19070 (27) | 18935 (24) | 14580 (36) |
| 늦을 것 같으니까 조금만 기다려 | 40115 (54) | 36435 (46) | 37350 (50) | 29970 (74) |

In the Table 2, the numeric values are theoretical input time expressed in units of milliseconds (ms; 1/1000 seconds). the numeric values in the parentheses ( ) means the number of the input typographical hits. Also, some of data in the specification of the present invention have been recited from the paper by Sang-whan Kim and Ro-whe Myeong, disclosed in 2001 in the HCI Society, and the data in the present invention is calculated in the same manner as in the paper.

It can be seen that an input time is proportional to the number of typographical hits in Samsung, LG, and SK inputting methods. This means that it is nearly impossible to develop a system which is remarkably advantageous over the current inputting system,. if a system of using twelve numeric keys is insisted at a state where the number of typographical hits cannot be reduced any more in terms of a methodological limitation.

The present invention uses nothing but a single key, because a key module to be depressed is always located below or on the bottom of a thumb in use of users. Thus, a time consumed for moving fingers is greatly reduced, and a gaze need not be shifted between a screen and keys. Thus, although the number of typographical hits increases by 50%, the total input time greatly decreases in comparison with the existing methods. Here, since the above-indicated times are theoretical input times calculated by a formula, and are presented for a simple purpose of comparison. Actually, an input can be performed within a shorter time in all types of terminals.

That is, a time theoretically taken to depress a key with the existing system (refer to the paper by Sang-whan Kim and Ro-whe Myeong, in 2001) is as follows.

Time taken for a user's finger to depress a key by moving a finger: 235 to 420 ms Time taken for a user's gaze to reciprocate between a keypad and a screen: 230 ms×2=460 ms Total time: 695 to 880 ms.

Meanwhile, a time theoretically taken to depress a key with the character inputting system according to the present invention is as follows.

Time taken for a user's finger to depress a first key: 235 ms

Time taken for a user's finger to depress a second key by moving a finger: 235 to 290 ms Total time: 470 to 525 ms.

Since a user gazes at a screen, a user's gaze reciprocating time taken for a user's gaze to reciprocate between a keypad and the screen is not needed.

That is, the present invention is theoretically faster than the existing system, in view of a character inputting speed. Also, the present invention has a merit capable of inputting characters with a hand taking hold of a phone. Also, after a user is accustomed to use a mobile terminal to a degree, he or she can input characters without watching the screen of the mobile terminal. Even at a state where a user puts a hand taking hold of a mobile terminal into pocket, he or she can input characters safely while walking.

As described above, the character inputting system for use in a mobile terminal, and the mobile terminal having the character inputting system, according to the preferred embodiment of the present invention, has been described for the case that the key module 10 includes the center key 10E, the upper key 10A, the right key 10B, the lower key 10C, the left key 10D, the mode key, and the seventh key. However, four keys can be additionally arranged in the key module 10, in which one is arranged between the upper key 10A and the right key 10B, another between the right key 10B and the lower key 10C, another between the lower key 10C and the left key 10D, and the other between the left key 10D and the upper key 10A. Then, the dual-key signals can correspond to the four keys.

By doing so, in a figure mode, ten keys including the upper key 10A, the right key 10B, the lower key 10C, the left key 10D, the center key 10E, the four keys respectively disposed between the upper key 10A and the right key 10B, between the right key 10B and the lower key 10C, between the lower key 10C and the left key 10D, and between the left key 10D and the upper key 10A, and the seventh key, are used to input the numbers of '0' to '9'.

Using the above-described ten kinds of keys, the upper key 10A can be assigned to the number '1', a key disposed between the upper key 10A and the right key 10B to the number '2', the right key 10B to the number '3', a key disposed between the right key 10B and the lower key 10C to the number '4', the lower key 10C to the number '5', a key disposed between the lower key 10C and the left key 10D to the number '6', the left key 10D to the number '7', a key disposed between the left key 10D and the upper key 10A to the number '8', the center key 10E to the number '9', and the seventh key to the number '0'. Accordingly, any number can be inputted.

INDUSTRIAL APPLICABILITY

As described above, the present invention provides a character inputting system for a mobile terminal, and a mobile terminal using the same, in which a minimum number of keys are disposed in a terminal restricted by space where a number of keys cannot be arranged in order to input characters as in mobile phones, personal digital assistants (PDAs), portable computers, or TV remote controllers, and thus desired characters can be smoothly input by using the minimum number of keys. Thus, the present invention provides an improved inputting speed and conveniences in use, in comparison with the existing inputting system.

As described above, the present invention has been described with respect to the particularly preferred embodiments, but the present invention is not limited in the above-described embodiments. It is apparent to one who has an ordinary skill in the art that there are many variations and modifications within the scope of the appended claims with departing off from the spirit of the present invention.

What is claimed is:

1. A system for inputting character data in a mobile terminal, the character inputting system comprising:
a key module having a center key disposed in the center, and an upper key, a lower key, a left key and a right key disposed about the center key at top, bottom, left and right sides thereof, respectively;
a signal generator coupled to the key module for generating at least one of a plurality of signals including: five normal-key signals each generated by clicking one of the keys in the key module for shorter than a predetermined time, five long-key signals each generated by clicking one of the keys in the key module for the predetermined time or longer, 25 first combination key signals each formed by a combination of two consecutive normal-key signals, and 25 second combination key signals each formed by a combination of a normal-key signal and a long-key signal; and
a data generator coupled to the signal generator for selectively generating a plurality of English alphabetic character data and a space datum each corresponding only to at least one of the first or second combination signals output from the signal generator;
wherein the characters are generated to include eight English alphabetic characters, consisting of N, B, U, C, M, B, W and E, each formed responsive to a sequence of said key clicks defining a key stroke path geometrically indicative of a corresponding alphabetic character shape.

2. The character inputting system of claim 1, wherein said data generator generates a symbolic character corresponding to each phoneme, if at least one phoneme included in each symbol name is established in advance so as to identify each symbol, and at least one phoneme established by each symbol is input, in the case that a mode set by the mode key is the symbolic mode.

3. The system of claim 1, wherein said data generator further comprises a memory storing English alphabet and symbolic character data corresponding to the first and second combination key signals, the English alphabet and symbolic character data being classified into a language mode and a symbol mode; wherein said key module further comprises a mode key generating a key signal enabling user-selective input of the modes.

4. The system of claim 1, wherein responsive to clicking key combinations of the upper key-center key, the right key-center key, the lower key-center key, and the left key-center key to generate the first combination key signals from the signal generator, said data generator generates 'N', 'D', 'U', and 'C' character data, respectively corresponding thereto.

5. The system of claim 4, wherein said data generator generates a symbolic character each corresponding to a phoneme, at least one identifying phoneme being included in each symbol name, at least one phoneme being established upon input of each symbol, when the symbolic mode is set.

6. The system of claim 1, wherein responsive to clicking key combinations of the upper key-upper key, the right key-right key, the lower key-lower key, and the left key-left key to generate the first combination key signals from the signal generator, said data generator generates 'M', 'B', 'W', and 'E' character data, respectively corresponding thereto.

7. A mobile terminal having a system for inputting character data, the mobile terminal comprising:
a character inputting system including:
a key module having a center key disposed in the center, and an upper key, a lower key, a left key and a right key disposed about the center key at top, bottom, left and right sides thereof, respectively;
a signal generator coupled to the key module for generating at least one of a plurality of signals including: five normal-key signals each generated by clicking one of the keys in the key module for shorter than a predetermined time, five long-key signals each generated by clicking one of the keys for the predetermined time or longer, 25 first combination key signals each formed by of a combination of two consecutive normal-key signals, and 25 second combination key signals each formed by a combination of a normal-key signal and a long-key signal; and
a data generator coupled to the signal generator for selectively generating a plurality of English alphabetic character data and a space datum each corresponding only to at least one of the first or second combination signals output from the signal generator; and a display displaying characters input by the character inputting system; wherein the characters are generated to include eight English alphabetic characters, consisting of N, B, U, C, M, B, W and E, each formed responsive to a sequence of said key clicks defining a key stroke path geometrically indicative of a corresponding alphabetic character shape.

8. A system for inputting English alphabetic character data, the system comprising:

a key module having five keys formed of a center key disposed in the center, and an upper key, a lower key, a left key, and a right key disposed about the center key at top, bottom, left, and right sides thereof, respectively;

a signal generator for generating 25 first combination key signals each formed by a combination of two normal-key signals each generated by clicking one of the keys in the key module for shorter than a predetermined time, and at least two second combination key signals each formed by a combination of one of the normal-key signals and one of the long-key signals each generated by clicking one of the keys in the key module for the predetermined time or longer, wherein the 25 first combination key signals respectively correspond to 24 English alphabetic characters and a space, and the two second combination key signals respectively correspond to the two remaining English alphabetic characters; and a data generator for generating 26 English alphabetic character data and a space datum corresponding only to the 27 key signals output from the signal generator;

wherein the characters are generated to include eight English alphabetic characters, consisting of N, B, U, C, M, B, W and E, each formed responsive to a sequence of said key clicks defining a key stroke path geometrically indicative of a corresponding alphabetic character shape.

9. The system of claim 8, wherein said data generator further comprises a memory storing English alphabet and symbolic character data corresponding to the first and second combination key signals, the English alphabet and symbolic character data being classified into a language mode and a symbol mode; wherein said key module further comprises a mode key generating a key signal enabling user-selective input of the modes.

10. The system of claim 9, wherein said data generator generates a symbolic character each corresponding to a phoneme, at least one identifying phoneme being included in each symbol name, at least one phoneme being established upon input of each symbol, when the symbolic mode is set.

11. The system of claim 8, wherein responsive to clicking key combinations of the upper key-center key, the right key-center key, the lower key-center key, and the left key-center key to generate the first combination key signals from the signal generator, said data generator generates 'N', 'D', 'U', and 'C' character data, respectively corresponding thereto.

12. The system of claim 8, wherein responsive to clicking key combinations of the upper key-upper key, the right key-right key, the lower key-lower key, and the left key-left key to generate the first combination key signals from the signal generator, said data generator generates 'M', 'B', 'W', and 'B' character data, respectively corresponding thereto.

* * * * *